(12) United States Patent
Borlez et al.

(10) Patent No.: US 6,700,542 B2
(45) Date of Patent: Mar. 2, 2004

(54) PLANAR ANTENNA

(75) Inventors: Yves Borlez, Heure-le-Romain (BE); Laurent Secretin, Liege (BE)

(73) Assignee: B.E.A.S.A., Angleur (BE)

( * ) Notice: Subject to any disclaimer, the term of this patent is extended or adjusted under 35 U.S.C. 154(b) by 0 days.

(21) Appl. No.: 10/122,553

(22) Filed: Apr. 15, 2002

(65) Prior Publication Data
US 2003/0076271 A1 Apr. 24, 2003

(30) Foreign Application Priority Data
Oct. 19, 2001 (EP) ............................................. 01125007

(51) Int. Cl.[7] .............................. H01Q 1/38; H04M 1/00
(52) U.S. Cl. ................... 343/700 MS; 455/562
(58) Field of Search .................. 343/700 MS, 810, 343/853, 876; 342/79, 99, 134, 359; 345/76; 455/562; 333/135, 137, 208, 248; H01Q 1/38; H04M 1/00

(56) References Cited

U.S. PATENT DOCUMENTS

| | | | | | |
|---|---|---|---|---|---|
| 4,893,126 A | * | 1/1990 | Evans | ......................... | 342/175 |
| 5,497,163 A | * | 3/1996 | Lohninger et al. | .......... | 342/175 |
| 5,656,980 A | * | 8/1997 | Zimmerman | ................ | 333/208 |
| 5,657,024 A | * | 8/1997 | Shingyoji et al. | ........... | 342/175 |
| 5,717,399 A | | 2/1998 | Urabe et al. | | |
| 5,764,189 A | * | 6/1998 | Lohninger | ........... | 343/700 MS |
| 5,877,726 A | * | 3/1999 | Kudoh et al. | ........ | 343/700 MS |
| 5,966,090 A | * | 10/1999 | McEwan | ..................... | 342/27 |
| 6,061,025 A | | 5/2000 | Jackson et al. | | |
| 6,064,862 A | * | 5/2000 | Grenon et al. | ................ | 455/73 |
| 6,175,723 B1 | | 1/2001 | Rothwell, III | | |
| 6,198,438 B1 | | 3/2001 | Herd et al. | | |
| 6,377,217 B1 | * | 4/2002 | Zhu et al. | ............ | 343/700 MS |
| 6,441,787 B1 | * | 8/2002 | Richards et al. | ..... | 343/700 MS |
| 6,501,427 B1 | * | 12/2002 | Lilly et al. | ........... | 343/700 MS |

FOREIGN PATENT DOCUMENTS

| | | |
|---|---|---|
| EP | 0 682 382 A2 | 11/1995 |
| EP | 0 707 220 A2 | 12/1996 |
| EP | 0 805 360 A2 | 11/1997 |
| WO | WO 01/92671 A1 | 5/2001 |

* cited by examiner

Primary Examiner—Hoang V. Nguyen
Assistant Examiner—Trinh Vo Dinh
(74) Attorney, Agent, or Firm—Woodling, Krost and Rust

(57) ABSTRACT

The invention is a planar antenna which comprises a plurality of antenna elements positioned relative to each other in a predetermined orientation. Each of the elements is selectively electrically connectable to one or more of the other antenna elements. A plurality of switches electrically connect the plurality of antenna elements to each other. The switches are opened and closed by a signal operating at high speed enabling the antenna to act alternately in a first antenna configuration and a second antenna configuration using the same antenna structure. Doppler signals from the first and second antenna configurations are processed to determine the direction of a person or object in relation to a door.

40 Claims, 8 Drawing Sheets

PLANAR ANTENNA

The invention relates to a planar antenna according to the features of the preamble of claim 1.

Planar antennas are known in the art. On top of their inherent interesting characteristics of size, cost and radiation performances, these antennas are generally used in all possible cases when an antenna radiation pattern change is required. Often a switching between two distinct configurations of the planar antenna is required. If used as detection antenna, these configurations correspond to two detection or radiation pattern widths. In order to provide different detection or radiation patterns, it is well known in the art to use two or more antennas. Other techniques consist of changing the detection or radiation pattern of the antenna by the use of absorbing material or metallic surrounding configurations. However, all of these techniques are based on a mechanical modifications of the antenna.

U.S. Pat. No. 6,175,723 relates to a self structuring antenna system which comprises a switchable antenna array as planar antenna. The antenna array is defined by a plurality of antenna elements that are selectively electrically connectable to each other by a series of switches. This allows the alteration of the physical shape of the antenna array without actually moving or mechanically changing the antenna. By changing the physical shape, the radiation pattern or lobe of the antenna can be altered. Furthermore, the shape of the antenna can be adapted to changing electrical and/or physical environments in order to achieve a good antenna performance. However, the switches are relays, either solid-state, mechanical or opto-electronic, generally mounted behind the antenna itself. Such switches are expensive and difficult to process. Therefore, this antenna structure is too expensive for cost-sensitive applications.

A typical cost-sensitive application for a planar antenna is an automatic door opener. Automatic door openers use door opener sensors which are usually made of waveguide transceivers. The output of the waveguide transceiver is a waveguide flange. However, it is very difficult and expensive to design a switch for different antennas which can be used in waveguide technology.

Therefore, it is an object of the invention to provide a planar antenna which can be produced at low costs and, therefore, can be used advantageously in low-cost applications, particularly in door opener sensors.

The planar antenna according to the invention is characterized by what is specified in the independent claim 1.

Advantageous embodiments of the invention are specified in the dependent claims.

A further object of the invention is to use such a planar antenna as part of a device performing a parallel traffic rejection algorithm which processes the information received from the planar antenna in such a way that at least two different lobes of the planar antenna are analyzed in order to calculate the direction of a pedestrian moving in or near to the area covered by a Door opener sensor An inventive planar antenna comprises the following elements:

a plurality of antenna elements positioned relative to each other in a predetermined orientation; each of the plurality of antenna elements being selectively electrically connectable to one or more of the other antenna elements;

a plurality of switches which electrically connect the plurality of antenna elements so that closing one of the switches causes at least two antenna elements to be electrically connected, an antenna array which is defined by the plurality of switches in combination with the plurality of antenna elements;

the antenna elements are positioned on a planar substrate in such a way that at least two different lobes of the antenna can be provided by activating different antenna elements by means of the switches located on the antenna substrate itself.

According to the invention a planar antenna has been designed which can be used in direct coupling to a waveguide output. This antenna is made of a substrate, particularly a microwave substrate, which comprises antenna elements. The antenna elements can comprise patches on the substrate. In a preferred embodiment the patches are etched on the microwave substrate. According to the invention, it is preferred to generate a switching function on the planar substrate itself than in the waveguide. The inventive antenna can be produced at low costs, particularly using microelectronic production techniques which are widely used and cheap.

The patches can comprise a central patch which performs a coupling function to a microwave circuitry, such as a waveguide, a coaxial probe, a hole or a slot coupling. Other types of microwave circuits with a connection via hole, coaxial probe, etc. are useable. All other patches should have a length which is optimized to make the respective patch resonate at a central frequency and a width which is adjusted to the impedance and radiation power of the antenna.

Preferably, a waveguide is provided for coupling to the planar antenna. The waveguide can comprise a transition to the planar antenna which is terminated by a waveguide flange. In a preferred embodiment, the transition comprises a "Doggy bone" filter which reduces spurious radiation at harmonic frequencies. The distance between the "Doggy bone" filter and the plane of the planar antenna should be at least about half a waveguide length when the waveguide is mounted on the surface of the planar antenna to achieve good filtering performance. In order to ensure a constant electromagnetic field on its rear aperture and to provide impedance matching, the waveguide can be enlarged in its larger dimension. Finally, the waveguide can comprise a rectangular aperture which is designed to provide enough energy to the central patch and to ensure a good matching between the waveguide and the planar antenna.

In order to avoid microwave leakage through the antenna control lines and ensure a total isolation of the planar antenna from the rest of the antenna control circuitry, a part of the control lines and the connection pads for applying DC current to the switches should be covered by a material absorbing microwaves.

According to the invention, PIN diodes are preferred as switches. The feeding of the PIN diodes and their insertion inside the antenna layout requires taking into account that these extra components should not modify or perturb the radiation characteristics of the antenna. According to the invention, the path used by the DC current to polarize the PIN diodes has been designed to have no influence on the antenna radiation pattern. In this context, the location of the connection of the line for feeding a PIN diode on the patch on which the PIN diode is mounted is of primary importance.

In a further aspect, the invention provides a circuitry for controlling the planar antenna by obtaining at least one Doppler Signal Sample from at least one measurement device working with at least one lobe of the planar antenna, processing the obtained Doppler Signals according to an algorithm and performing a high-speed switching between the configurations of the planar antenna in accordance to the algorithm.

The circuitry preferably comprises sample and hold circuits for sampling the obtained Doppler Signals. The sample and hold circuits can be synchronized with the high-speed switching. Advantageously, the circuitry can comprise a digital signal processor for processing the at least one Doppler Signal. In a preferred embodiment, the digital signal processor processes two Doppler signals obtained from two measurement devices, preferably Schottky diodes positioned in a transceiver of the antenna, and corresponding to two different lobes of the planar antenna and calculates from the Doppler signals an intermediate lobe by weighting the Doppler signals. The circuitry can also comprise an oscillator which produces a sampling frequency signal with an accuracy suitable for sampling. In cases of the use of a high stability frequency source, the circuitry can be formed to perform weighting of the two lobes by pulse width modulation of the antenna control signal. The weighting between the two antenna lobes would be achieved by the meaning action of the amplifier low pass filter. Then, at least one detection chain would be sufficient to retrieve the weighted Doppler signal.

The preferred field of application of the planar antenna are Door opener applications. Advantageously the antenna is used in a Door opener sensor.

Such a Door opener sensor can perform a parallel traffic rejection algorithm which processes the information received from the planar antenna in such a way that at least two different lobes of the planar antenna are analyzed in order to calculate the direction of a pedestrian moving in or near to the area covered by the Door opener sensor. In contrast to known Door opener sensors, traffic in front of a door can be detected more securely in that a door controlled by the sensor only opens when a person intends to enter the door, i.e., the person walks in a certain direction which falls within a detection area of the sensor.

Additional objects, advantages, and features of the present invention will become apparent from the following description taken in conjunction with the accompanying drawings.

The entire antenna is composed of an assembly of a waveguide 10 and a planar circuit antenna 30.

Figure 1:
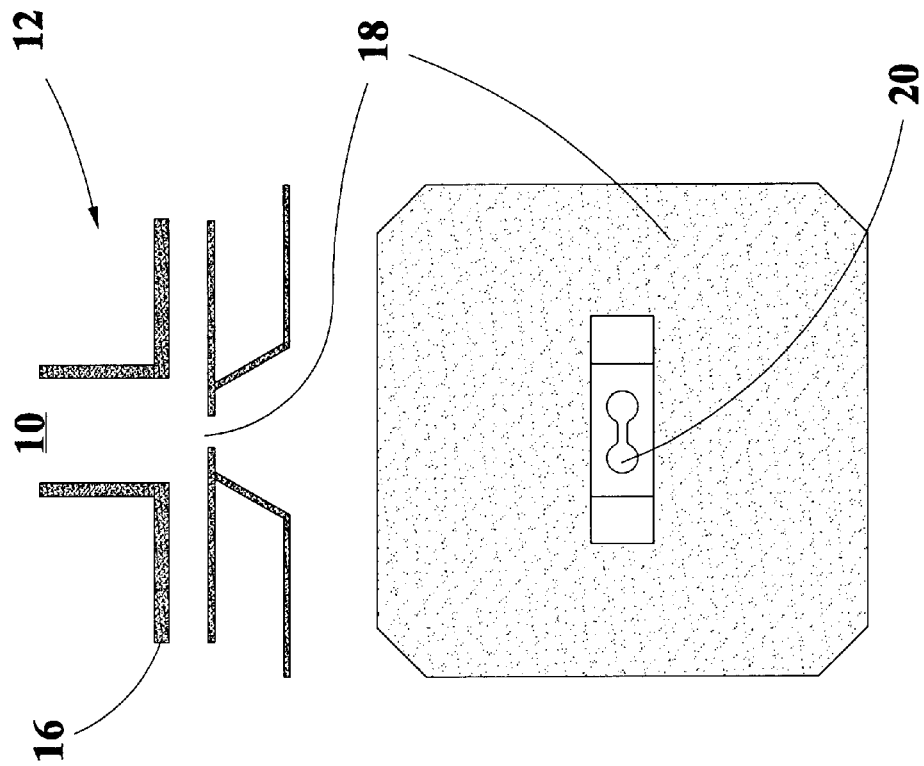
FIG. 1 shows an embodiment of a waveguide antenna holder.
Figure 1:
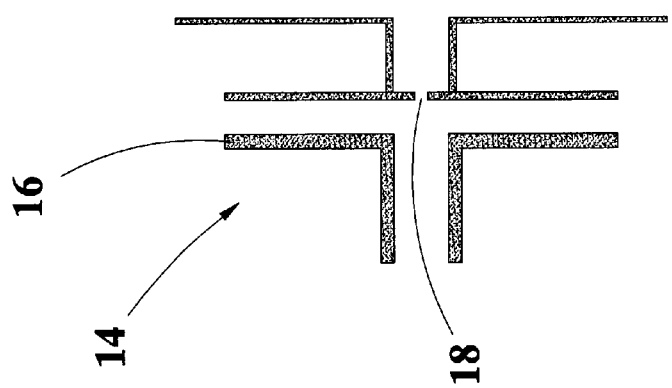

FIG. 1 shows the waveguide 10. A waveguide flange 16 terminates a transceiver and a waveguide transition section 18 is designed to be compatible with the transceiver output. Inside the waveguide transition section 18, a "Doggy Bone" filter 20 is used to reduce the level of spurious radiation at harmonic frequencies. Reference numeral 12 denotes a top view and 14 a side view of the waveguide 10.

After the filter 20, a waveguide length is used to keep a required distance between the filter 20 and the antenna plane so that the electromagnetic fields inside are not perturbed by the proximity of the two entities. Furthermore, the waveguide 10 is enlarged in its larger dimension to ensure a constant electromagnetic field on the antenna rear aperture (minimizing the E-field cosine variation inside the waveguide) and provide impedance matching.

Figure 2:
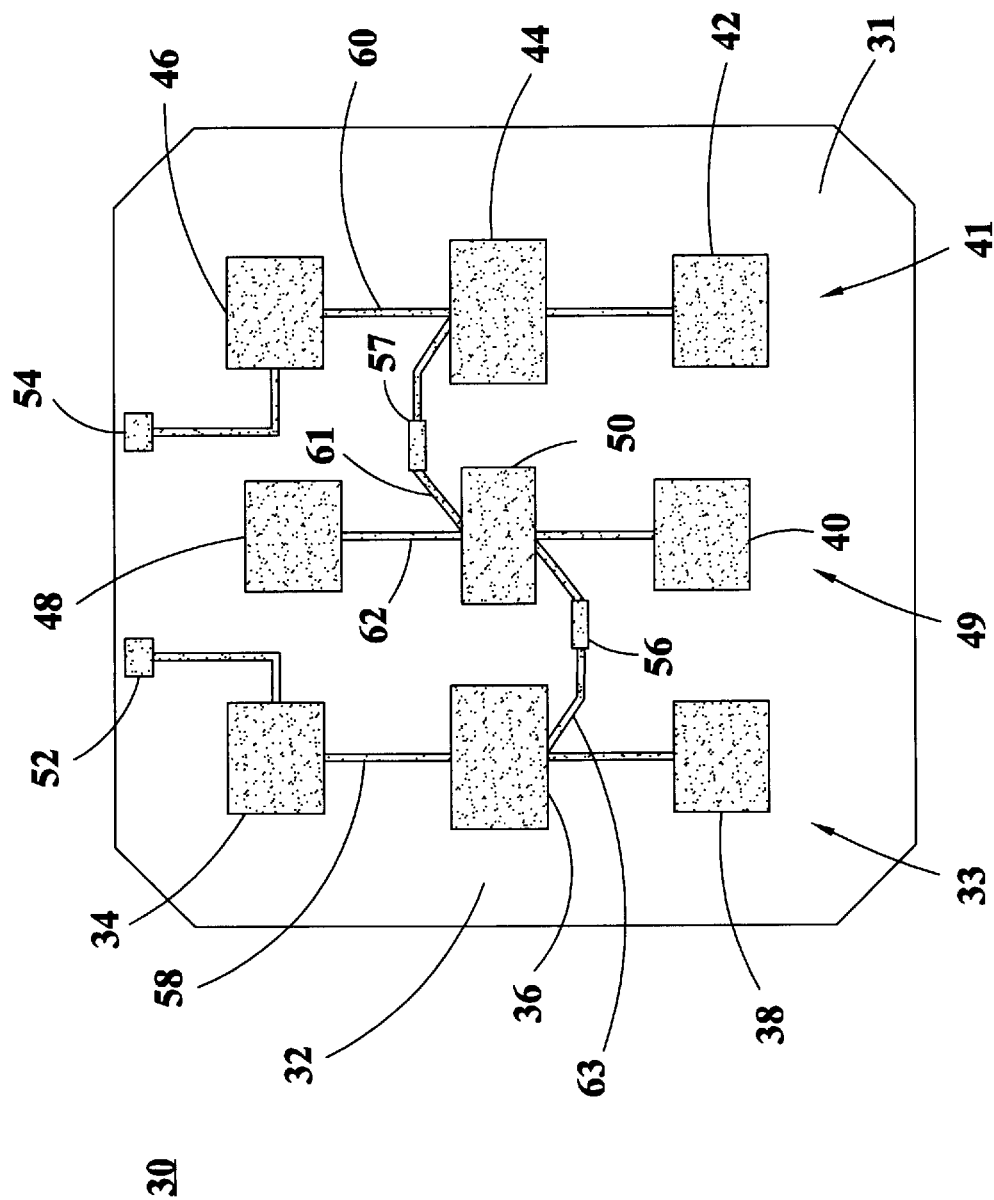
FIG. 2 shows an embodiment of the layout of the planar antenna.

The planar antenna 30, shown in FIG. 2, is placed at the extremity of the waveguide length and the electro-magnetic fields are coupled from the waveguide to the antenna by means of a rectangular aperture. This aperture is designed to provide enough energy to a central patch 50 of the substrate 31 of the planar antenna 30. Furthermore, it ensures a good match. After coupling the energy of the electromagnetic radiation to the central patch 50, it is also distributed to other patches 34, 36, 38, 40, 42, 44, 46, 48 by use of microstrip lines 58, 60, 62. The particularities of the coupling lines are explained below.

The antenna structure is composed of three lines 33, 49, and 41 of three patches each. The left line 33 comprises patches 34, 36, 38, the right line 41 patches 42, 44, 46, and the central line 49 patches 40, 48, 50. Each line 33, 41, 49 forms an antenna element. In each line, the patches are electrically connected to each other by the mentioned microstrip lines 58, 60, and 62 respectively. Therefore, three antenna elements are formed on the planar antenna 30.

The shape of the central patch 50 differs from the shapes of the other patches 34, 36, 38, 40, 42, 44, 46, and 48, due to its coupling function with the waveguide 10. The other patches 34, 36, 38, 40, 42, 44, 46, and 48 are patches which have a length optimized to make each patch resonate at the central frequency of the antenna. The width of the patches 34, 36, 38, 40, 42, 44, 46, and 48 is used to adjust the impedance and radiation power of the antenna. This technique is also applicable to larger size antenna, particularly antennas with larger dimensioned patches and/or more patches.

As already mentioned, the antenna is composed of three antenna elements or lines respectively of three patches each. Inside each line, the coupling is ensured by two (microstrip) lines 58, 60 connected on each side of the central patch 50 and feeding the edge patches 34, 36, 38, 40, 42, 44, 46, and 48. The length of each of these lines 58, 60 is designed so that the patches 34, 36, 38, 40, 42, 44, 46, and 48 are all radiating in phase along the line.

The two lateral lines 58 and 60 are then linked to the central line 62 by horizontal coupling lines 61, 63, which have been designed to feed the lateral lines 58, 60 in phase and to save symmetry along the structure of the antenna 30. This gives the "S" shaped coupling around the central patch 50. Some matching and relative power adjustment can be provided by the change of microstrip impedance resulting from the change in line width. This is useful to adjust the antenna horizontal radiation pattern and to optimize the return loss of the entire assembly.

Through all the lines, the power generated by the waveguide 10 on the central patch 50 is distributed to all the antenna elements 33, 41, 49 with the required proportion.

Particularly, in Door Opener applications, it is an advantage to have two types of antenna patterns: a large horizontal lobe and a narrow one. Since each lobe corresponds to an antenna, two different antennas are required. Both antennas should have the same vertical radiation pattern. To achieve this, it is necessary to use switch elements to switch between the two configurations.

The switching is performed by PIN diodes 56 and 57, which are mounted on the horizontal coupling lines 63 and 61 respectively. These diodes 56 and 57 act as active switches with which the patches 34, 36, 38, and 42, 44, 46 can be connected with or disconnected from the central patch 50. This allows the control of the flow of microwave power to the lateral patches 34, 36, 38, and 42, 44, 46.

The PIN-diodes 56 and 57 have the property to provide a low series resistance in "ON" state and a low capacitance in "OFF" state. Therefore, they are preferred elements in order to provide good switching performance without complicated matching circuitry around the PIN-diodes.

When the PIN-diodes are in "ON" state, the two lateral patch lines 33 and 41 are fed and the antenna behaves like a 3×3 patches antenna giving a narrow lobe in the horizontal plane. This configuration is used for narrow lobe applications.

When the diodes are in "OFF" state, the two lateral patch lines 33 and 41 are disconnected from the central patch line 49. The horizontal coupling lines 56, 57 are disconnected. Therefore, the antenna comprises a single line patch antenna with patches 40, 48, 50 and a wide radiation or reception pattern in the horizontal plane and a radiation or reception pattern similar to the pattern of a narrow lobe antenna in the vertical plane.

The diodes 56 and 57 can be surface mount devices (SMD) having minimum package parasitic. The diodes 56 and 57 can be mounted on the center of a matching pad where the microstrip width is larger. At this point, the level of impedance is rather low and the impedance of the diode in "OFF" state is sufficiently high to provide good isolation.

In order to switch correctly, there must be an appropriate polarization applied to the diodes. To set the diodes in "ON" state, it is necessary to bias it with a current of approximately 10 mA. To set the diode in "OFF" state, a bias voltage of about 0 V is applied. However, it is required that the diodes 56 and 57 are not left floating for the "OFF" state.

Therefore, the two diodes 56 and 57 are DC supplied in series. This has several advantages:

If one of the diodes breaks, the current won't flow inside the second one and the antenna will come back to the most used larger lobe.

Putting the two diodes in series reduces the amount of polarization lines and, therefore, the perturbations of the antenna radiation pattern generated by these lines.

As the two diodes are polarized in series, essentially the same current flows through them. Therefore, a good match is achieved between the two sides of the antenna, which amends the symmetry of the lobe.

As essentially the same current flows through the diodes, the current consumption is reduced to about 1 time of the polarization current even if two diodes are used.

In the following, the optimal connection of the polarization lines to the side antennas is explained. In most of polarization circuits, it is very important to ensure that no microwave signal is flowing through it, since there could be some side effects coming from non-linearity or perturbation mixing of the microwave signal inside the low frequency circuitry. It could then be a problem if this would cause either noise or Doppler like signal (any signal between 30 Hz and 400 Hz). Furthermore, if these lines pick up some microwave signal, they may cause the generation of antenna radiation pattern distortion. To avoid this, a special configuration of the antenna 30 has been used.

Figure 3:
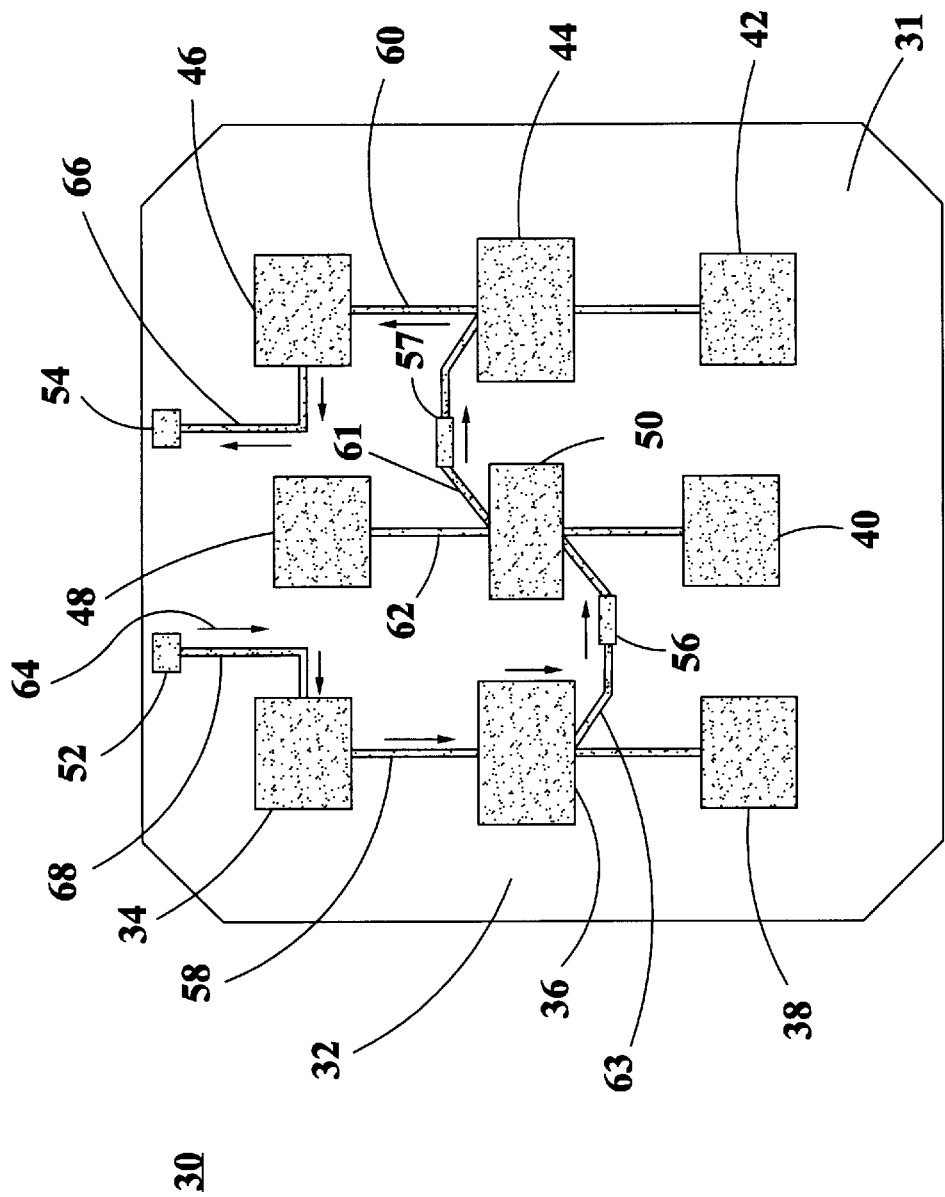
FIG. 3 shows the DC-current path of the antenna of FIG. 2.

Electromagnetic simulations have shown that a resonant patch antenna has a maximum voltage at the edges and a minimum on the center of the lateral side. This is precisely where a thin line is connected to provide the DC current to the diodes. Electromagnetic simulations have also shown that the rejection of Microwave power, using this strategy could reach up to 35 dB. FIG. 3 shows the DC-path of the antenna 30. DC-Current is applied by means of connection-pads 52 and 54, which are connected by thin lines to the patches 34 and 46 respectively.

Figure 4:
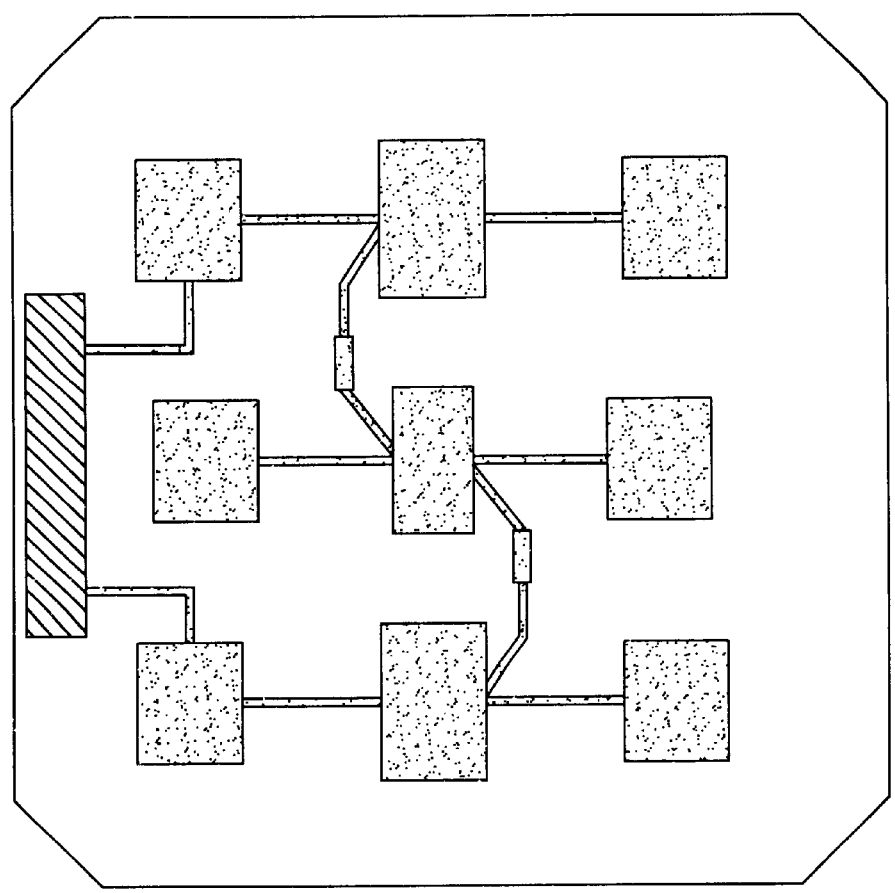
FIG. 4 shows the placement of absorbing material on the antenna of FIG. 2.

In order to ensure a total isolation of the antenna from the rest of the radar circuit, additional precautions are required. This can be accomplished by the use of microwave absorbing material stuck on top of the polarization lines. FIG. 4 indicates the absorbing material applied to the surface of the antenna. The shape of the absorbing material is designed to stay on the antenna substrate.

Figure 5:
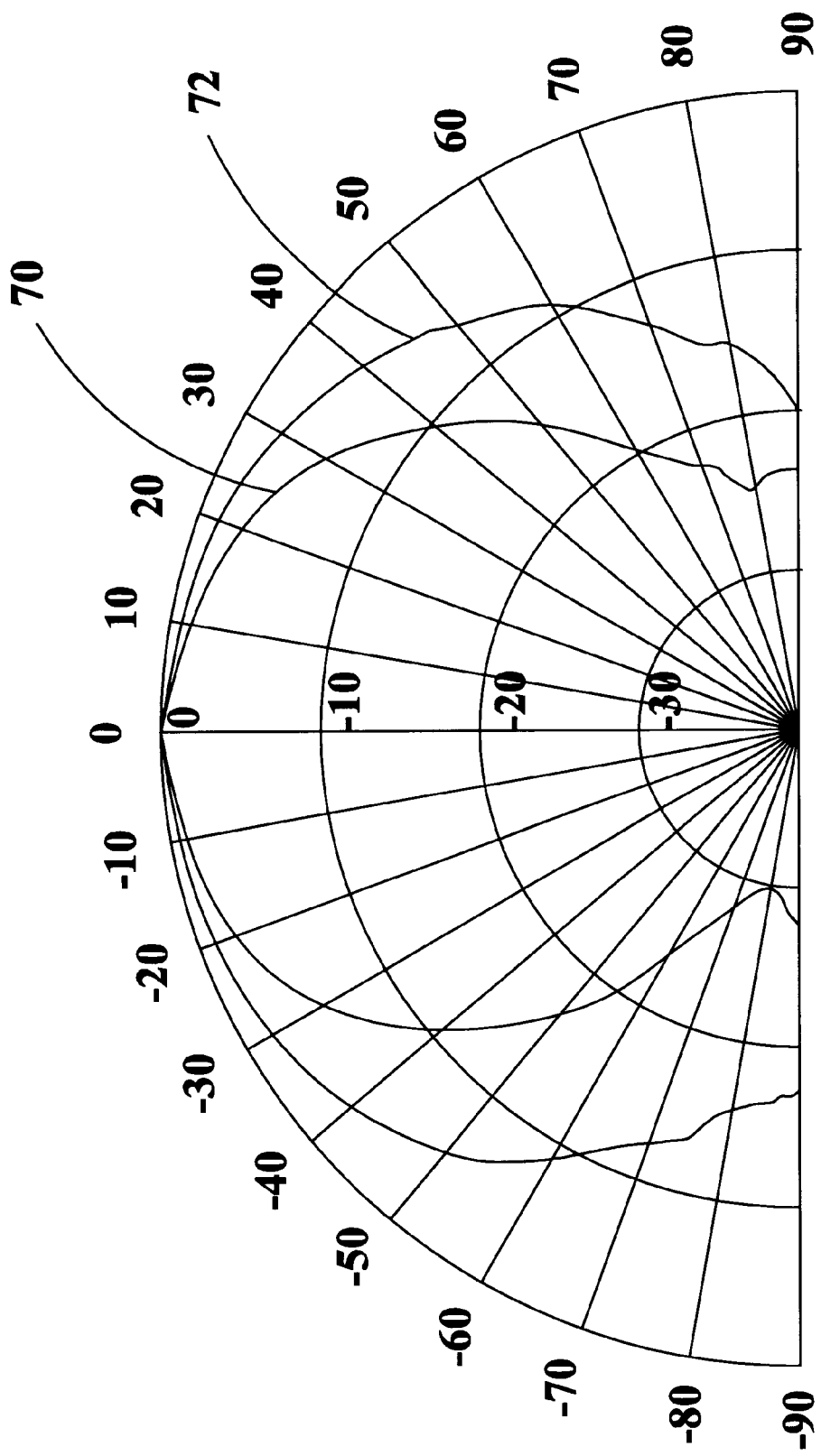
FIG. 5 shows a diagram with the two possible horizontal radiation pattern of the antenna of FIG. 2.
Figure 6:
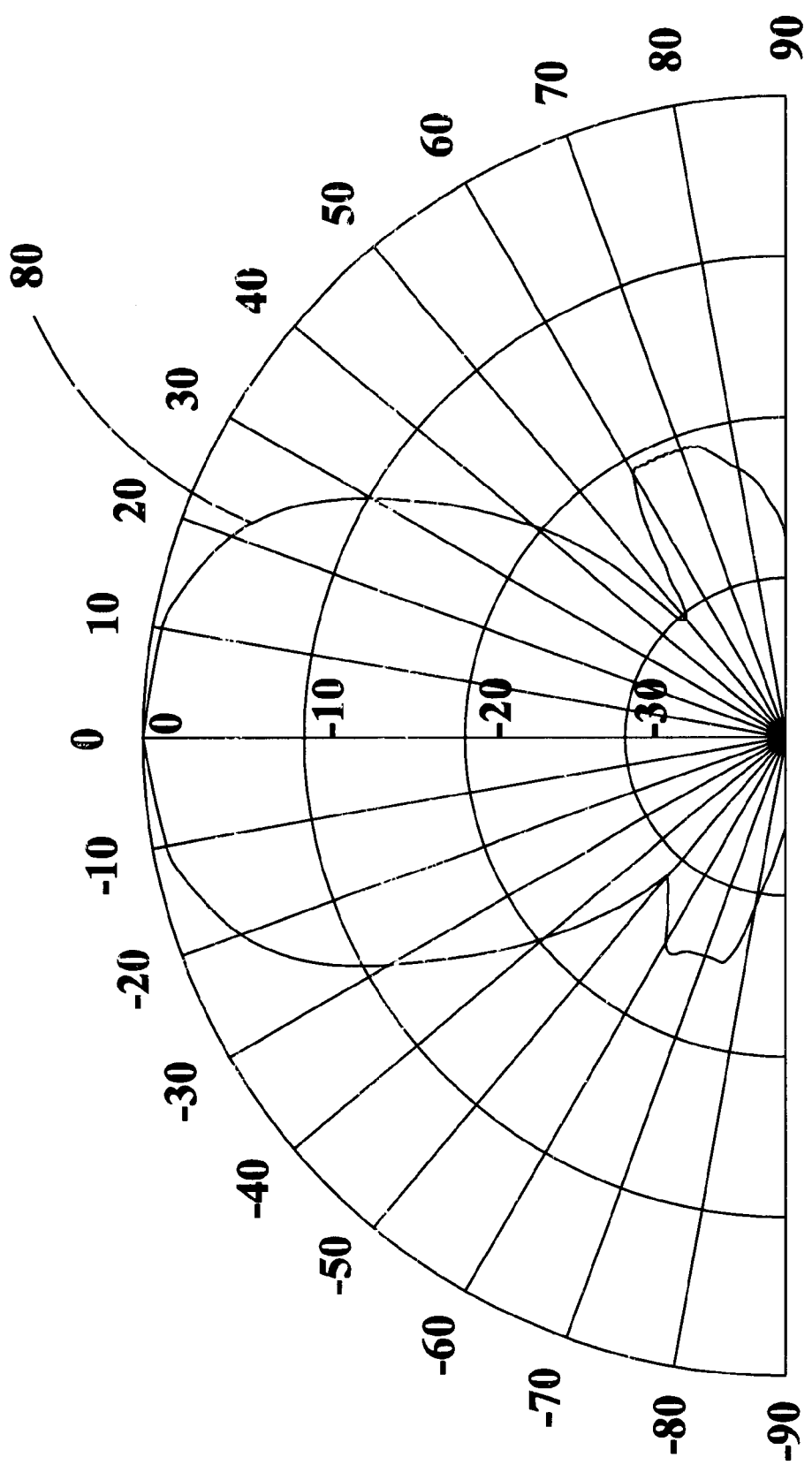
FIG. 6 shows a diagram with the typical vertical radiation pattern in both configurations of the antenna of FIG. 2.

By electronically switching between the two antennas, it is now possible to have two different lobes 70, 72 of the antenna according to the control voltage applied. FIG. 5 shows two possible lobes 70 and 72 generated by switching the configuration of the antenna. The lobes 70 and 72 relate to the horizontal distribution of the radiation patterns of the two configurations of the antenna. A mechanical change of the antenna is no longer required. A single antenna can simply provide different lobes by electronically switching. In the vertical plane, as all of the antenna elements 33, 41, 49 are quite similar, the radiation pattern 80 is almost the same independently of the antenna configuration, as shown in FIG. 6. Therefore, the vertical radiation pattern 80 is nearly identical for both configurations of the planar antenna 30.

The use of such an antenna has also the advantage to be readily compatible with existing low cost transceivers based on waveguide technology. The assembly of such devices is less critical and the implementation is more rugged than a full planar solution. A foam radome can be used to protect the diodes.

The above described techniques are rather general and can be used in different situations where a variation of an antenna lobe is required. An electronic processing of the Doppler signal and control of the antenna allow a lot of different configurations.

Electronic switching of the antenna opens the way to a control of the antenna by a processor and, by that mean, an adjustment of the radiation pattern by remote control. Not only it is possible to switch between the two extreme configurations, but also, through the use of an algorithm, it is possible to generate equivalent detection lobes being in between the two extremes. A weighting of the Doppler signal received in each configuration will be used to get all the intermediate states required.

Figure 7:
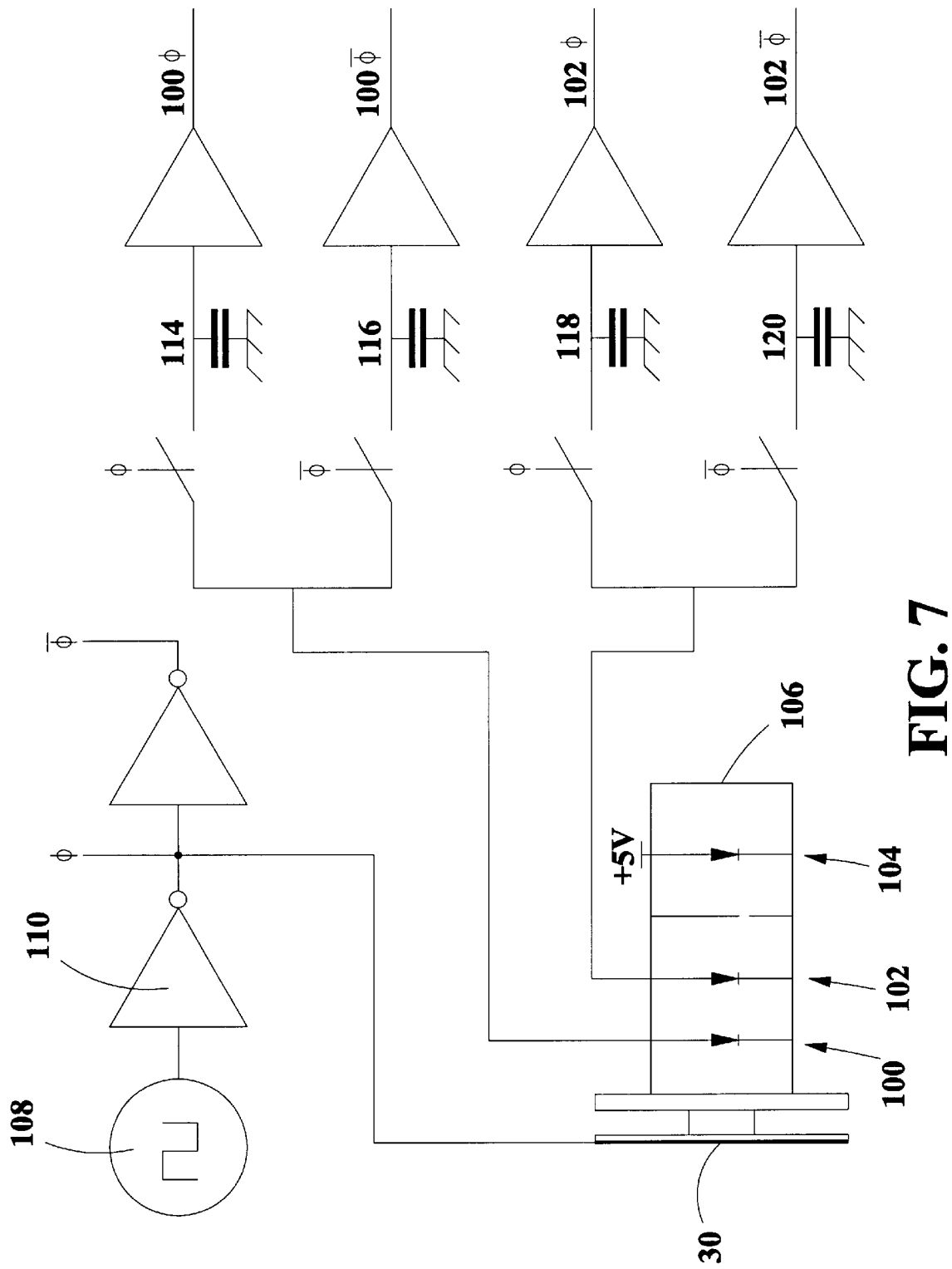
FIG. 7 shows an embodiment of an IF processing circuit for use with the antenna of FIG. 2.

FIG. 7 shows an circuitry for IF Processing connected to a microwave transceiver 106. The transceiver 106 comprises a waveguide mounted on a planar antenna 30. The processing obtains the Doppler signals of two Schottky diodes 100 and 102 provided in the microwave transceiver 106 for each of the two antenna configurations. For that purpose, a signal received by the antenna 30 is sampled in each configuration of the antenna 30 and a high speed switching is done between the two configurations of the antenna 30. Sample and hold circuits 114, 116, 118, and 120 are synchronized with the switching of the configurations of the antenna 30 in order to switch the output signals of the Sample and hold circuits 114, 116, 118, and 120 on the corresponding channels.

With such a circuit, it is possible to retrieve the Doppler signal of the two Schottky diodes 100 and 102 for the two configurations of the antenna nearly simultaneously and to send them to a processor for digital processing. If the processor takes only into account the signal coming from a single antenna configuration, a sensor will have the detection pattern of the antenna switched to this position. However, if the two configurations are available simultaneously, it is possible to calculate any intermediate lobe, by weighting the Doppler signals.

In this technique, the sampling clock can be provided either by the processor or by an auxiliary oscillator 108 whose frequency accuracy is not critical, provided it remains sufficiently high in order to provide good sampling.

In case of a very high frequency stability microwave source, it is possible to use Pulse Width Modulation (PWM) for the sampling. In such a case, only one detection chain would be enough to retrieve the signal. The duty cycle would make the selection between the lobes.

Figure 8:
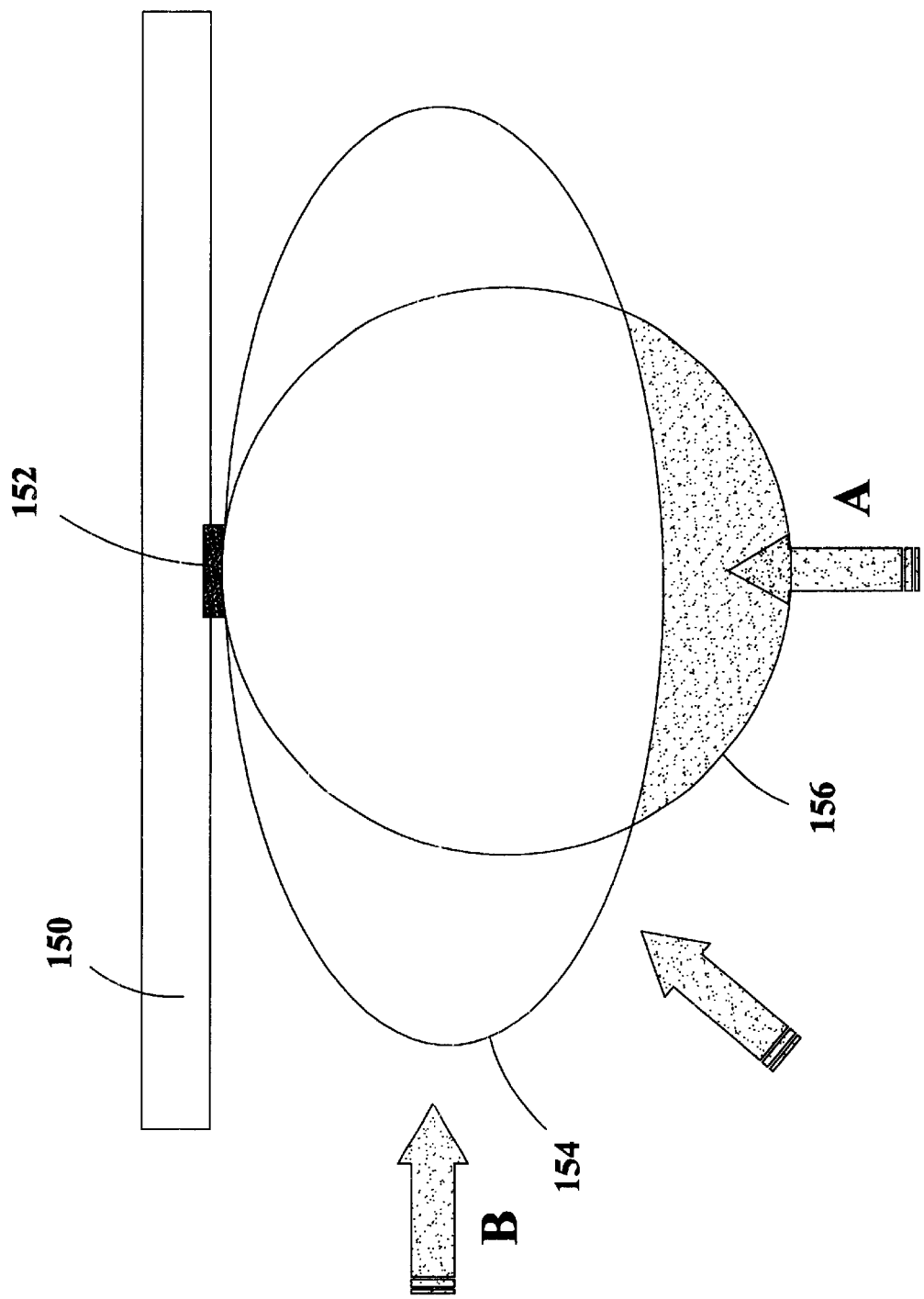
FIG. 8 shows the application of the invention in an automatic door opener.

Such an planar active antenna 30 used in an active antenna sensor delivers more information than a single antenna. The use of the extra information received from the planar active antenna 30 can lead to an effective pedestrian parallel traffic rejection algorithm used in door opener systems, as shown in FIG. 8. By observing simultaneously the amplitude of the Doppler signal coming from the two antenna configurations of an active antenna sensor 152 mounted on top of a door 150, it is possible to determine from which side a pedestrian is coming.

If the horizontal radiation patterns of the active antenna sensor 152 are carefully chosen one could then correlate the information generated by the same target in both antenna configurations in order to approximate the angle of the target trajectory compare to the axis of the sensor.

If the target is coming in the axis of the sensor (direction A) the magnitude of the signals corresponding to the second configuration detection field 156 (narrow field) will be higher than the one corresponding to the first configuration detection field 154 (wide field). On the opposite, if a target walks in a parallel way to the door's 150 header (direction B) the magnitude of the signals corresponding to the wide detection field will be higher than the one corresponding to the narrow field. If the magnitude ratio between the signals generated with both antenna configurations are continuously computed, the angle of the target trajectory could then be evaluated. Furthermore, this information could then be compared to a specified level in order to discriminate targets walking in parallel to the door's 150 header.

Above it was described embodiments of a planar antenna according to the invention. The invention does not restrict the planar antenna designs to those described above. Nor does the invention restrict in any way the materials used therein. Nor does the invention restrict in any way the coupling is made between the transceiver and the central patch. The inventional idea may be applied in different ways within the scope defined by the independent claim 1.

LIST OF REFERENCE SIGNS 10 waveguide
12 top view of waveguide
14 side view of waveguide
16 waveguide flange
18 transition section
20 filter
30 planar antenna circuit
31 substrate
33 line
34 patch
36 patch
38 patch
40 patch
41 line
42 patch
44 patch
46 patch
48 patch
49 line
50 central patch
52 connection pad
54 connection pad
56 PIN diode
57 PIN diode
58 microstrip line
60 microstrip line
61 coupling line
62 microstrip line
63 coupling line
70 lobe
72 lobe
80 radiation pattern
100 Schottky diode
102 Schottky diode
106 transceiver
108 oscillator
114 circuit
116 circuit
118 circuit
120 circuit
150 door
152 sensor
154 detection field
156 detection field

What is claimed is:

1. A planar antenna (30) comprising:
   a plurality of antenna elements (33, 41, 49) positioned relative to each other in a predetermined orientation, each of the plurality of antenna elements (33, 41, 49) being selectively electrically connectable to one or more of the other antenna elements,
   a plurality of switches (56, 57) electrically connecting the plurality of antenna elements so that closing one of the switches causes at least two antenna elements to be electrically connected,
   an antenna array (30) defined by the plurality of switches (56, 57) in combination with the plurality of antenna elements (33, 41, 49), characterized in that
   a central antenna element and two lateral antenna elements (33, 41, 49) are positioned on a planar substrate (31) in such a way that at least two different lobes (70, 72) of the antenna are provided by activating different antenna elements (33, 41, 49) by said switches (56, 57) said antenna elements (33, 41, 49) comprise each at least two patches (34, 36, 38, 40, 42, 44, 46, 48, 50), wherein the patches of each antenna element are electrically connected by vertical lines (58, 60, 62) and the lateral antenna elements (33, 41) respectively and the central antenna element (49) are electrically connectable by said switches (56, 57).

2. A planar antenna according to claim 1 wherein said planar antenna is employed as a door opener sensor (152) which performs a parallel traffic rejection algorithm which processes the information received from said planar antenna in such a way that at least two different lobes (154, 156) of said planar antenna are analyzed in order to calculate the direction of a pedestrian moving in or near to the area covered by said Door opener Sensor (152).

3. A planar antenna according to claim 1, characterized in that,
   a waveguide (10) is provided for coupling to the planar antenna.

4. A planar antenna according to claim 3, characterized in that
   the waveguide (10) comprises a transition (18) to the planar antenna which is terminated by a waveguide flange (16).

5. A planar antenna according to claim 1, characterized in that
the plurality of antenna elements (33, 41, 49) comprise patches (34, 36, 38, 40, 42, 44, 46, 48, 50) on the planar substrate (31).

6. A planar antenna according to claim 5, characterized in that
the patches (34, 36, 38, 40, 40, 42, 46, 48, 50) comprise a central patch (50) which performs a coupling function to a microwave circuitry, such as a waveguide (10), a coaxial probe, via a hole, a slot coupling or any other type of coupling.

7. A planar antenna according to claim 5, characterized in that,
a waveguide (10) is provided for coupling to the planar antenna.

8. A planar antenna according to claim 7, characterized in that
the waveguide (10) comprises a transition (18) to the planar antenna which is terminated by a waveguide flange (16).

9. A planar antenna according to claim 6, characterized in that
all other patches (34, 36, 38, 40, 42, 44, 46, 48) have a length which is optimized to make the respective patch resonate at a central frequency and a width which is adjusted to the impedance and radiation power of the antenna.

10. A planar antenna according to claim 9, characterized in that
it comprises a left, a central and a right antenna element (33, 41, 49) each comprising three patches (34, 36, 38, 40, 42, 44, 46, 48, 50), wherein the patches of each antenna element are electrically connected by vertical lines (58, 50, 62) and the left and right antenna elements (33, 41) respectively and the central antenna element (49) are electrically connectable by switches (56, 57).

11. A planar antenna according to claim 10, characterized in that,
a waveguide (10) is provided for coupling to the planar antenna.

12. A planar antenna according to claim 11, characterized in that
the waveguide (10) comprises a transition (18) to the planar antenna which is terminated by a waveguide flange (16).

13. A planar antenna according to claim 9, characterized in that,
a waveguide (10) is provided for coupling to the planar antenna.

14. A planar antenna according to claim 13, characterized in that
the waveguide (10) comprises a transition (18) to the planar antenna which is terminated by a waveguide flange (16).

15. A planar antenna according to claim 6, characterized in that
it comprises a left, a central and a right antenna element (33, 41, 49) each comprising three patches (34, 36, 38, 40, 42, 44, 46, 48, 50), wherein the patches of each antenna element are electrically connected by vertical lines (58, 50, 62) and the left and right antenna elements (33, 41) respectively and the central antenna element (49) are electrically connectable by switches (56, 57).

16. A planar antenna according to claim 15, characterized in that,
a waveguide (10) is provided for coupling to the planar antenna.

17. A planar antenna according to claim 16, characterized in that
the waveguide (10) comprises a transition (18) to the planar antenna which is terminated by a waveguide flange (16).

18. A planar antenna according to claim 6, characterized in that,
a waveguide (10) is provided for coupling to the planar antenna.

19. A planar antenna according to claim 18, characterized in that
the waveguide (10) comprises a transition (18) to the planar antenna which is terminated by a waveguide flange (16).

20. A planar antenna according to claim 1, characterized in that,
a waveguide (10) is provided for coupling to the planar antenna.

21. A planar antenna according to claim 20, characterized in that
the waveguide (10) comprises a transition (18) to the planar antenna which is terminated by a waveguide flange (16).

22. A planar antenna according to claim 21, characterized in that
the transition (18) comprises a "Doggy bone" filter (20) which reduces the spurious radiation at harmonic frequencies.

23. A planar antenna according to claim 22, characterized in that
the distance between the "Doggy bone" filter (20) and the plane of the planar antenna (3) is about a waveguide length when the waveguide (10) is mounted on the surface of the planar antenna (30).

24. A planar antenna according to claim 20, characterized in that
the waveguide (10) is enlarged in its larger dimension in order to ensure a constant electromagnetic field on its rear aperture to provide impedance matching.

25. A planar antenna according to claim 24 wherein said waveguide (10) comprises a rectangular aperture which is designed to provide enough energy to said central patch (5) and to ensure a good matching between the waveguide (10) and said planar antenna.

26. A planar antenna according to claim 25 wherein said switches are PIN diodes.

27. A planar antenna according to claim 26 further comprising a path for DC current to polarize said PIN diodes and formed to have no influence on the antenna radiation pattern.

28. A planar antenna according to claim 27 further comprising connection pads (52, 54) for applying DC current to said diodes.

29. A planar antenna according to claim 28 further comprising control lines (66, 68) and a material absorbing microwaves covering said control lines (66, 68).

30. A planar antenna according to claim 1 further comprising circuitry for controlling said planar antenna (30) by obtaining at least one Doppler Signal from at least one measurement device (100, 102) working with at least one lobe of said planar antenna (30), and, processing said Doppler Signal according to an algorithm and performing high-speed switching between the configurations of said planar antenna (30) in accordance with said algorithm.

31. A planar antenna according to claim 30 wherein said circuitry further comprises sample and hold circuits (114, 116, 118, 120) for sampling said obtained Doppler Signals.

32. A planar antenna according to claim 31 wherein said sample and hold circuits (114, 116, 118, 120) are synchronized with said high-speed switching.

33. A planar antenna according to claim 32 wherein said circuitry comprises a digital signal processor for processing said Doppler Signal.

34. A planar antenna according to claim 33 wherein said digital signal processor processes two Dopplor Signals obtained from two measurement devices (100, 102) and corresponding to two different lobes of said planar antenna and calculates from said Doppler Signals an intermediate lobe by weighting said Doppler Signals.

35. A planar antenna according to claim 34 further comprising an oscillator (108) which produces a sampling frequency signal with an accuracy suitable for sampling.

36. A planar antenna according to claim 35 wherein said sampling is performed by pulse width modulation.

37. A planar antenna as claimed in claim 2 wherein said planar antenna is mounted on a door header and operates as a door opener sensor and controller.

38. A planar antenna as claimed in claim 1 wherein said switches (56, 57) are located on the antenna substrate.

39. A planar antenna (30) comprising:
a plurality of antenna elements (33, 41,49) positioned relative to each other in a predetermined orientation, each of the plurality of antenna elements (33, 41, 49) being selectively electrically connectable to one or more of the other antenna elements, a plurality of switches (56, 57) electrically connecting the plurality of antenna elements so that closing one of the switches causes at least two antenna elements to be electrically connected, an antenna array (30) defined by the plurality of switches (56, 57) in combination with the plurality of antenna elements (33, 41,49), characterized in that the antenna elements (33, 41, 49) are positioned on a planar substrate (31) in such a way that at least two different lobes (154, 156) of the antenna are provided by activating different antenna elements (33, 41,49) by said switches (56, 57) located on the antenna substrate, circuitry for controlling said planar antenna (30) which obtains Doppler Signals from measurement devices, said circuitry comprises a digital signal processor for processing said Doppler Signals, and, said digital signal processor performs a parallel traffic rejection algorithm which processes said Doppler Signals such that said at least two different lobes (154, 156) of said planar antenna are analyzed to calculate the direction of a pedestrian moving in or near to the area covered by said planar antenna.

40. A planar antenna (30) comprising: a plurality of antenna elements (33, 41, 49) positioned relative to each other in a predetermined orientation, each of said plurality of antenna elements (33, 41, 49) being selectively electrically connectable to said other antenna elements, a plurality of switches (56, 57) electrically connecting said plurality of antenna elements so that closing said switches causes said antenna elements (33, 41, 49) to be electrically connected in a first antenna configuration and that opening said switches isolates antenna element (49) in a second antenna configuration, each said antenna element comprises three patches and said antenna element (49) includes a central radiation patch for distribution of power to said antenna elements (33, 41).

* * * * *